UNITED STATES PATENT OFFICE.

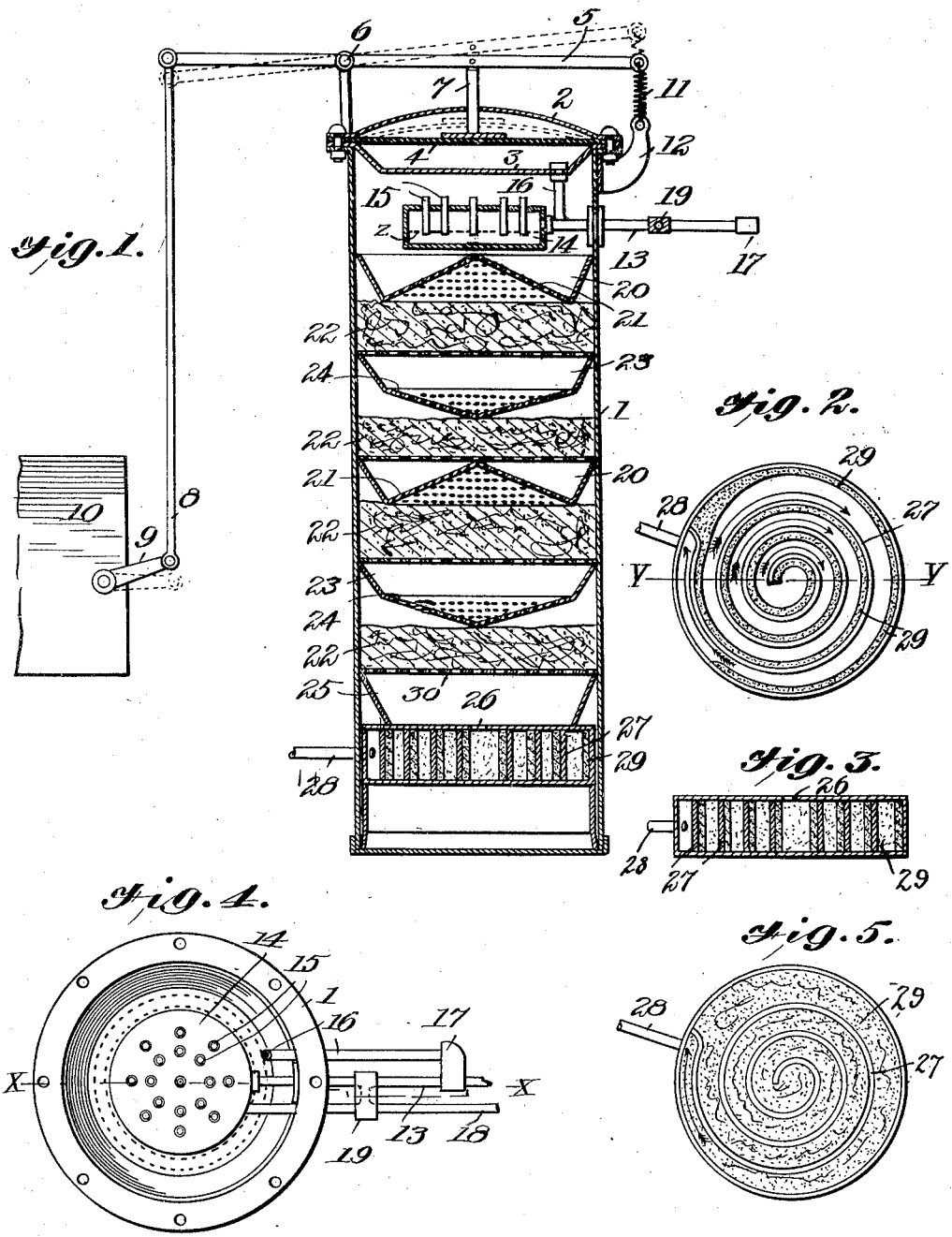
C. O. WILLIAMS.
CARBURETER.
APPLICATION FILED JULY 29, 1911.
1,025,553.
Patented May 7, 1912.

CHARLES O. WILLIAMS, OF ST. LOUIS, MISSOURI, ASSIGNOR TO FRED E. ARNOLD, OF IONIA, MICHIGAN.

CARBURETER.

1,025,553.  Specification of Letters Patent.  Patented May 7, 1912.

Application filed July 29, 1911. Serial No. 641,289.

*To all whom it may concern:*

Be it known that I, CHARLES O. WILLIAMS, a citizen of the United States, residing at St. Louis, in the State of Missouri, have invented certain new and useful Improvements in Carbureters, of which the following is a specification.

My invention relates to improvements in apparatus for carbureting air from hydrocarbons, as gasolene, &c., and its objects are to provide a means whereby the gasolene will become thoroughly mixed with air, while passing through the apparatus; and, furthermore, to provide a means for thoroughly diffusing the gasolene as it passes through the apparatus. I attain these objects by the mechanism illustrated in the accompanying drawing, in which—

Figure 1 is a vertical section of the apparatus practically on the line $x$—$x$ of Fig. 4. Fig. 2 is a plan view of the mixture coil with the cover removed. Fig. 3 is a vertical section on the line $y$—$y$ of Fig. 2. Fig. 4 is a plan of the top of the tank with the cover removed, and Fig. 5 is a plan of the mixture coil showing a different arrangement of the absorbent material.

In the construction of this apparatus, I employ a large tank 1. The cover of this tank has a metal top and bottom, 2 and 3, respectively, which form an air tight compartment between them. This air tight compartment is centrally divided by a flexible diaphragm 4, preferably made of india rubber, so that it may, by pressure of air below it, be flexed from its normal position, as indicated by the dotted lines in Fig. 1. The diaphragm will have sufficient elasticity to sustain a heavy pressure of air below it without being forced against the top 2. This flexible diaphragm is utilized to operate a governor to govern the flow of the mixture to the consuming device, as an engine, a light plant, &c., by means of a lever 5, pivoted to a supporting arm 6 and extending over the top of the tank where it is connected by a rod 7 to the diaphragm in such a manner that every movement of the diaphragm caused by the varying pressure of air below it, will be transmitted to the lever to raise and lower the free end thereof. The free end of the lever is connected, by means of a rod 8, with a governing lever 9 that actuates a properly arranged valve in the governor chamber 10, to control the air supply of the apparatus all of which will be more fully described in a separate application. The upward movement of the diaphragm is opposed by a spring 11 connected at one of its ends to a bracket 12 on the tank, and at its other end to the lever 5.

Air under pressure is delivered into the tank 1 by a pipe 13 entering a closed receiving chamber 14 located in the upper portion of the tank, and the air passes out of said chamber into the tank through several small tubes 15 extending from the chamber 14. A branch air pipe 16 is connected to the main air pipe 13, outside the tank at 17, and passes thence into the chamber that is formed by the parts 2 and 3.

Gasolene is fed to the tank through a pipe 18. This pipe is connected with the air pipe 13, as indicated at 19, so that the gasolene is sprayed into the tank, the gasolene and a direct current of air being both forced into the receiving chamber 14 until the gasolene has reached about the level of the dotted line $z$, when both are forced out of the tubes 15 into the main tank 1 in a fine spray.

Below the receiving chamber 14 the tank 1 is divided by pans and absorbent material, into several compartments. The pans 20 are made with upwardly inclined bottoms 21 which are finely perforated so that as the gasolene drops upon them it will percolate through these perforations in fine particles into the absorbent material 22, just below each of the pans. The pans 23 are, as will be seen, made with perforated bottoms 24, that are constructed with the cone inclining downward. The pans 20 and 23 alternate, and by this variation in the construction of the bottoms of the pans, the gasolene that has not already been mixed with air is continually being broken up into fine particles and mixed with air in its passage through each pan and body of absorbent material, until it reaches the lowermost pan 25, from which it is forced through a central opening 26 in the bottom thereof into the mixture coil 27, from which latter the carbureted air is forced through the pipe 28 to the point of consumption. It must be borne in mind that the same pressure is maintained in all parts of the tank 1 so that the gasolene will be thoroughly impregnated with air when it leaves the coil, and all impurities will be removed by its passage through the absorbent material.

In the construction of the coil 27, I prefer that a thin layer of some quickly absorbing material be placed around the margin of its walls, as indicated at 29, to take up all the liquid that may be left, so that the gas will have a free channel to pass through. This will render it utterly impossible for any liquid matter to pass out of the coil, especially as the outlet pipe 28 is placed a short distance up from the bottom the coil. In the last named construction the absorbent material may be reasonably compact, while with the coil completely filled with absorbent material as shown in Fig. 5, said material must be so loosely laid as not to materially interfere with the passage of the mixture through it. This works well where the drain is not great, but if great, as when running an engine, I prefer the open channel between the absorbent material and the wall of the coil. The coil herein referred to is a casing containing a spirally arranged partition. The top of the casing is the bottom of the pan 25.

The pan 25 has a perforated cover 30, while the bottom, which forms the top of the coil chamber, has but one small, central opening 26, so that any liquid gasolene that may be left after percolating through the several pans and partitions of absorbent material, will be retained in the pan 25 long enough to be reduced as nearly to the gaseous state as possible before finally passing into the coil chamber, where it is held and further reduced, as hereinbefore stated.

I claim:

1. In a carbureter, a tank divided into a series of compartments having perforated conical bottoms, said bottoms projecting alternately upward and downward, absorbent material between the compartments, air and hydrocarbon inlets to the tank, a chamber below the lowermost compartment, said chamber having an inlet and an outlet, and containing a spirally arranged partition, and absorbent material between the convolutions of the spiral partition.

2. In a carbureter, a tank divided into a series of compartments having perforated conical bottoms, said bottoms projecting alternately upward and downward, absorbent material between the compartments, air and hydrocarbon inlets to the tank, a pan below the lowermost compartment, said pan having a central opening in its bottom, a chamber below the pan, said chamber being in communication with the pan through the aforesaid bottom opening and having an outlet, a spirally arranged partition in the chamber, and absorbent material between the convolutions of the spiral partition.

Signed at city of Ionia, Mich., June 1, 1911.

CHARLES O. WILLIAMS.

In presence of—
 H. C. CLARK,
 L. M. PULLMAN.

Copies of this patent may be obtained for five cents each, by addressing the "Commissioner of Patents, Washington, D. C."